(12) United States Patent
Reuter

(10) Patent No.: US 6,628,012 B2
(45) Date of Patent: Sep. 30, 2003

(54) UNINTERRUPTIBLE POWER SUPPLY

(75) Inventor: Uwe Reuter, Osterode am Harz (DE)

(73) Assignee: Piller GmbH, Osterode (DE)

( * ) Notice: Subject to any disclaimer, the term of this patent is extended or adjusted under 35 U.S.C. 154(b) by 187 days.

(21) Appl. No.: 09/766,524

(22) Filed: Jan. 19, 2001

(65) Prior Publication Data

US 2001/0009338 A1 Jul. 26, 2001

(30) Foreign Application Priority Data

Jan. 21, 2000 (DE) .......................................... 100 02 583

(51) Int. Cl.⁷ ................................................ H01F 1/00
(52) U.S. Cl. ............................ 307/68; 307/43; 307/64; 307/78; 307/80; 307/82
(58) Field of Search ............................. 307/64, 43, 80, 307/82, 78, 68

(56) References Cited

U.S. PATENT DOCUMENTS

| | | | | |
|---|---|---|---|---|
| 4,997,346 A | * | 3/1991 | Bohon ........................ | 417/319 |
| 6,023,152 A | * | 2/2000 | Briest et al. ................ | 323/207 |
| 6,175,166 B1 | * | 1/2001 | Bapat .......................... | 307/64 |
| 6,184,593 B1 | * | 2/2001 | Jungreis ...................... | 307/64 |
| 6,400,591 B2 | * | 6/2002 | Reilly et al. ................ | 363/125 |

FOREIGN PATENT DOCUMENTS

DE 198 57 754 C1 12/1998

OTHER PUBLICATIONS

Stromspeicher für die Energieversorgung, 1995, pp. 842, 844,845.
Unterbrechungsfreie Stromversorgungen für kritische Verbraucher, 1993, pp. 1116–1121.
Es geht auch sparsamer und umweltfreundlicher, 01/98, pp. 17–20.
Modulares autonomes elektrisches Energieversorgungssystem, 1987, pp. 1080,1082,1085.

* cited by examiner

*Primary Examiner*—Gregory J. Toatley, Jr.
*Assistant Examiner*—Robert L Deberadinis
(74) *Attorney, Agent, or Firm*—Thomas, Kayden, Horstemeyer & Risley

(57) ABSTRACT

An uninterruptible power supply system (UPS) includes a coupling choke (5) being operably arranged between an electrical load (2) and an external source of power (4). A generator (8) is operably connected to the coupling choke (5) on the side of the electrical load (2), and it is designed and arranged to be active during normal conditions and during trouble conditions. Trouble conditions are to be understood as conditions when the external source of power (4) fails. A converter (9) is operably connected to the coupling choke (5). A substitute storage device for electrical energy is operably connected to the coupling choke (5) on the side of the electrical load (2) by the converter (9). A fast-opening switch (6) is operably connected the coupling choke (5) on the side of the source of power (4), and it is designed and arranged to open in case of occurring trouble conditions. A first unit (12) is designed and arranged to sense an output voltage being supplied to the electrical load (2) and to produce a measuring signal (25). A second unit (27) is designed and arranged to control the output voltage, to use the measuring signal (25) as an input signal, to deliver a control signal (26) as an output signal to the converter (9) and to control the output voltage to attain a desired shape over time.

19 Claims, 1 Drawing Sheet

UNINTERRUPTIBLE POWER SUPPLY

CROSS REFERENCE TO RELATED APPLICATIONS

This application claims the benefit of co-pending German Patent Application No. 100 02 583.8-34 entitled "Vorrichtung zur unterbrechungsfreien Stromversorgung einer elektrischen Last mit Wechselstrom", filed on Jan. 21, 2000.

FIELD OF THE INVENTION

The present invention generally relates to an apparatus for uninterruptedly supplying power as alternating current to an electrical load. Under normal conditions, the electrical load is supplied with power by an external source of power, for example by a public network. It is common practice in the art to also call such an apparatus an UPS.

BACKGROUND OF THE INVENTION

Apparatuses for uninterruptedly supplying power as alternating current to an electrical load are commonly known in the art. The known apparatuses control an output voltage being supplied to the electrical load not only in case of trouble conditions, but also during normal conditions when the electrical load is supplied with power by a public network or by a different external source of power. This is the case in the product "UNIBLOCK" of Piller GmbH, Osterode am Harz, Germany. "UNIBLOCK" includes an electrical machine having a separate engine winding and a generator winding or coil. The engine winding of the electrical machine is used as a drive. Under normal conditions, the machine is fed by the external source of power. Under trouble conditions, the machine is fed by a battery, for example. An inverter is arranged after the battery. A combustion engine directly driving the electrical machine may be arranged to compensate for rather long breakdowns of the power supply by the external source of power. The output voltage for the electrical load may be taken from the generator winding of the electrical machine. The output voltage almost has the form or shape of an ideal sine even in case of varying input voltage or varying output current. This fact results from the construction of the electrical machine including a special dampening cage. The known product "UNIBLOCK" has the disadvantage of the special electrical machine being rather complicated and expensive.

It is also known in UPS systems to connect a substitute power supply device for the trouble conditions to a coupling choke at the side of the load. The coupling choke is arranged between the load and the external source of power. The coupling choke prevents the current from flowing into a current network breaking down before a fast-opening switch may be opened. Usually, the fast-opening switch is arranged at the side of the source in front of the coupling choke. The coupling choke at least prevents great short circuit currents with respect to the current network.

It is also known in the art that a substitute storage device for electrical energy in a UPS may include different sources of energy typically providing direct current becoming inverted to alternating current by an inverter.

SUMMARY OF THE INVENTION

Briefly described, the present invention provides an apparatus for uninterruptedly supplying power as alternating current to an electrical load being supplied with power by an external source of power during normal conditions.

The apparatus includes a coupling choke being operably arranged between the electrical load and the external source of power. A generator is operably connected to the coupling choke on the side of the electrical load, and it is designed and arranged to be active during normal conditions and during trouble conditions. Trouble conditions are to be understood as conditions when the external source of power fails. A converter is operably connected to the coupling choke. A substitute storage device for electrical energy is operably connected to the coupling choke on the side of the electrical load by the converter. A fast-opening switch is operably connected the coupling choke on the side of the source of power, and it is designed and arranged to open in case of occurring trouble conditions. A first unit is designed and arranged to sense an output voltage being supplied to the electrical load and to produce a measuring signal. A second unit is designed and arranged to control the output voltage, to use the measuring signal as an input signal, to deliver a control signal as an output signal to the converter and to control the output voltage to a desired shape over time.

The present invention also relates to an uninterruptible power supply system (UPS). The system includes a coupling choke being operably arranged between an external source of power and an electrical load to be supplied with power by the external source of power during normal conditions. A generator is operably connected to the coupling choke. The generator is constructed and placed to be active during normal conditions as well as during trouble conditions meaning conditions when the external source of power fails. A converter is operably connected to the coupling choke. A substitute storage for electrical energy is operably connected to the coupling choke via the converter. A switch is operably connected the coupling choke. The switch is constructed and arranged to open quickly in case of occurring trouble conditions. A first unit is designed and arranged to sense an output voltage being supplied to the electrical load and to produce a measuring signal. A second unit is designed and arranged to control the output voltage or electric potential, to use the measuring signal as an input signal, to send a control signal as an output signal to the converter and to control the output voltage to attain a certain desired shape over time.

The novel UPS system combines the advantages of a static system, especially a fast control of the voltage, with the advantages of a rotating system, especially a great short circuit power. The novel UPS system includes a standard generator. The standard generator is connected to the coupling choke in shunt Standard generators of different power are sold at a low price. The one winding or coil of the generator is used as engine winding and, simultaneously, as generator winding. During normal conditions as well as during trouble conditions, the generator provides the output voltage being supplied to the load and the idle power being required by the respective load. During normal conditions the effective power for the load is supplied by the external source of power. Usually, the external source of power is the public network. During trouble conditions, the load is supplied with effective power by the substitute storage device for electrical energy via the converter. During trouble conditions, a first unit being constructed and placed to control the output voltage controls the converter in response to a measuring signal by a control signal in a way that the output voltage being supplied to the load has the value over time. The at least one first unit being designed and arranged to control the output voltage may be a control device. The measuring signal is produced by at least one second unit being constructed and placed to sense and determine the output voltage. The unit being designed and arranged to sense the output voltage may be a voltage sensor. Usually, it is desired to achieve a sinusoidal shape of the output voltage.

It is advantageous if the unit for controlling the output voltage controls the value of the output voltage over time to reach the desired form in response to the output signal of the unit for sensing the output voltage even when the external source of power does not fail. In this way, the converter helps to improve the quality of the power supply also during normal conditions. The converter has an effect on the output voltage during each variation of the value over time being different from the ideal shape.

It is to be understood that the converter of the novel UPS is a unit being capable of reacting quickly to undesired variations of the output voltage clue to the control signal. Thus, it is especially desired that the converter is an IGBT converter. It is known in the art that IGBT stands for "Isolated Gate Bipolar Transistor" meaning a certain semiconductor technology being suitable for the field of power electronics.

It is no problem and it is known in the art to design the unit for controlling the output voltage, preferable the control unit, to be sufficiently fast.

A combustion engine for directly driving the generator during trouble conditions may serve to compensate for rather long breakdowns of the external source of power. Preferably, the combustion engine is coupled to the generator by an overunning clutch. In this way, the combustion engine may be started without having a negative influence on the generator, and it starts to drive the generator after having reached its nominal number of revolutions. It is not necessary to control a separate coupling movement of the active combustion engine to the generator.

The substitute storage device for electrical energy supplying the converter of the novel UPS with power includes at least one source of energy supplying direct current or alternating current. The source of energy supplying direct current may include a super conductive magnetic energy storage device (SMES), a super capacity, a battery or a fuel cell. The source of energy supplying alternating current may include a generator including a rotating centrifugal mass. A converter may be arranged in front of the generator. In this way, the generator may be arranged to be parallel to possible sources of energy supplying direct current.

A transformer may be arranged between the load and the converter being controlled by the unit for controlling the output voltage. Preferably, the transformer is also arranged between the generator and the converter. Using an IGBT converter, a load may be supplied with an output voltage in the medium voltage range, and the respective output voltage may be controlled to attain the desired form. The generator may be designed as a usual standard generator being directly applicable in the medium voltage range. This fact is an outstanding advantage compared to special electrical machines usually not being available for this voltage range.

As it is already known in the art, the coupling choke may also be partly arranged between the generator and the converter, on the one hand, and the load, on the other hand to prevent the generator and the converter, respectively, from being subject to great short circuit currents in the region of the load.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
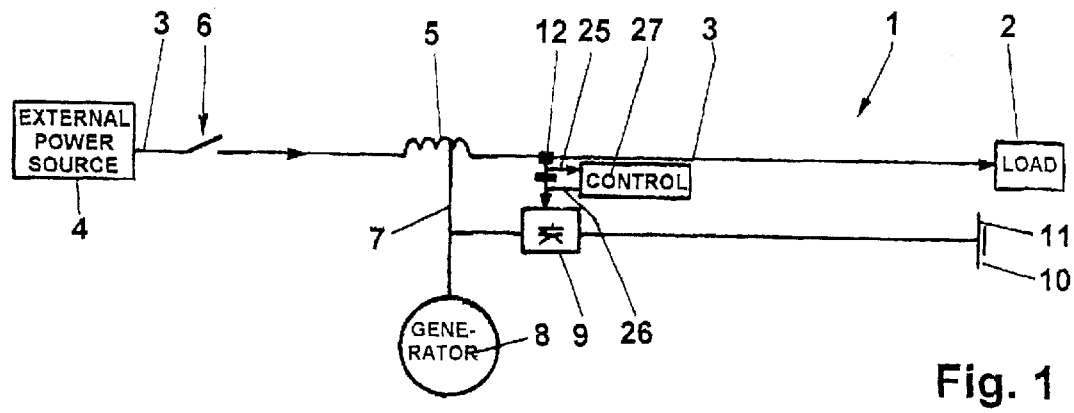
FIG. 1 is a single-line schematic view of a first embodiment of the novel UPS.

Referring now in greater detail to the drawings, FIG. 1 illustrates an apparatus 1 for uninterruptedly supplying power to an electrical load 2. The apparatus 1 includes a connecting line 3 connecting the electrical load 2 and an external source of power 4. For example, the external source of power 4 may be a public network. A coupling choke 5 and a fast-opening switch 6 are arranged between the electrical load 2 and the external source of power 4. A stub line 7 is connected to the coupling choke 5 on the side of the electrical load 2. The stub line 7 leads to a generator 8, on the one hand, and to a converter 9, on the other hand. The generator 8 is operated at effective power in shunt with respect to the primary power supply. The converter 9 is fed by a source of power 10 supplying direct current. In the illustrated exemplary embodiment, the source of power 10 is designed as a battery 11. The source of power 10 is controlled by a control device 27 using a control signal 26. With the converter 9, the control device 27 controls the output voltage being supplied to the electrical load 2. A voltage sensor 12 serves to sense the output voltage and to produce and deliver a measuring signal 25. The measuring signal 25 is coordinated with the control algorithm of the control device 27 in a way that a deviation from an ideal sinus function or sine shape of the output voltage and a deviation from the desired values of the voltage (peak value and effective value of the voltage, respectively) preferably are compensated completely and instantly. The control device 27 may effect the correction of the output voltage by controlling the converter 9 also in case the switch 6 is closed and the external source of power 4 does supply the electrical load 2 with power.

However, the converter 9 especially serves to supply the electrical load 2 with power from the source of power 10 supplying direct current in case the external source of power 4 fails. The failure, the breakdown or the interruption of the external source of power 4 may also be called trouble conditions. When the trouble conditions start, the switch 6 opens preferably fast. However, even during transition times, the coupling choke 5 prevents substantial amounts of currents from flowing to the external source of power 4. Consequently, a breakdown of the output voltage at the load 2 is prevented. The generator 8 being operated during normal conditions and as well during trouble conditions provides the base form of the output voltage and the idle power being required by the electrical load 2. Since the quality of the value of the output voltage over time may be determined by the converter 9 also in case of normal conditions, the requirements to the generator 8 are not great. This is true even at a low quality of the power supply of the external source of power 4. For this reason, a standard generator may be used as generator 8. The requirements to the converter 9 are great since a quick reaction to an undesired change of the output voltage is necessary. This quick reaction is realized by designing the converter 9 as an IGBT converter.

Figure 2:
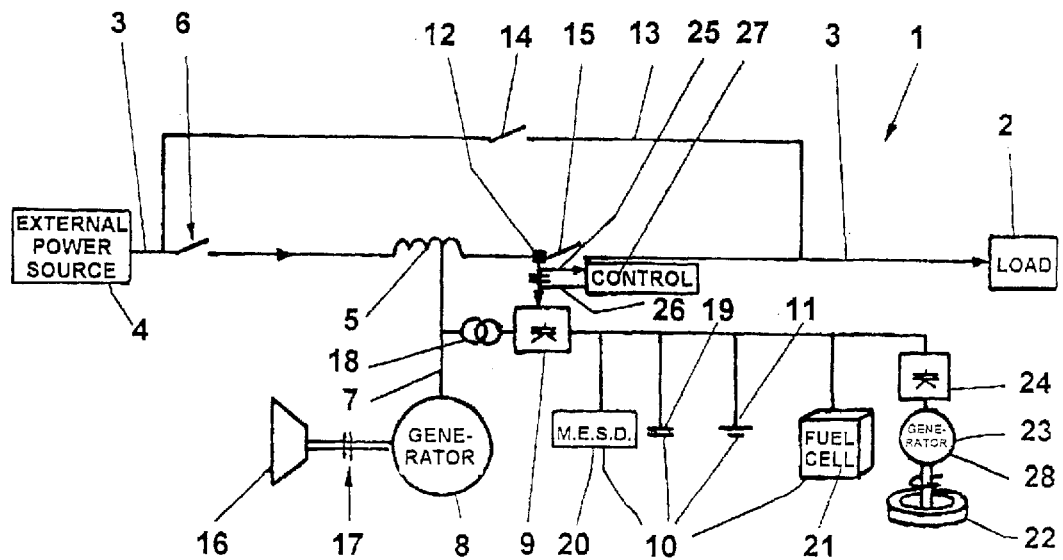
FIG. 2 is a single line schematic view a second embodiment of the novel UPS.

The exemplary embodiment of the UPS 1 illustrated in FIG. 2 includes some additional elements compared to the UPS illustrated in FIG. 1. However, the function and operation of the UPS 1 are substantially the same as it has been explained with respect to FIG. 1.

The UPS 1 illustrated in FIG. 2 includes a bypass 13 by which the UPS 1 may be bypassed in case of its failure. In this way, the bypass 13 serves to prevent the UPS 1 from having any influence on the electrical load 2 during a failure or breakdown of the UPS 1. For his purpose, a switch 14 being located in the bypass 13 will be closed, and a switch 15 being located between the switch 6 and in the bypassed portion of the connecting line 3 will be opened.

Additionally, a standard generator serving to compensate rather long breakdowns of the external source of power 4 may be driven by a combustion engine 16. The combustion engine 16 is operably connected to the generator 8 by an overrunning clutch 17.

Furthermore, a transformer 18 is arranged in front of the converter 9 when seen from the direction of the coupling choke 5 and the generator 8. The transformer 18 makes it possible to operate the electrical load 2 at medium voltage. An IGBT converter is not directly suitable for medium voltage. However, a standard generator used as the generator 8 may be designed to be directly suitable for medium voltage without problem.

Finally, different types of sources of power 10 supplying direct current to the converter 9 are illustrated in FIG. 2. In addition to the battery 11 that has already been explained with respect to FIG. 1, there is a super capacity 19, a super conductive magnetic energy storage device 20 and a fuel cell 21. Furthermore, a rotating centrifugal mass 22 and a generator 23 being arranged thereafter serve as a source of power 28 supplying alternating current. A further converter 24 is prearranged to the source of power 28 supplying alternating current. The converter 24 may be an IGBT device. In this case, the source of power 28 supplying alternating current is connected parallel to the source of power 10 supplying direct current. With the novel UPS 1, it is also possible to use different sources of power supplying direct current or alternating current known in the art.

Many variations and modifications may be made to the preferred embodiments of the invention without departing substantially from the spirit and principles of the invention. All such modifications and variations are intended to be included herein within the scope of the present invention, as defined by the following claims.

I claim:

1. An apparatus for uninterruptedly supplying power as alternating current to an electrical load being supplied with power by an external power source during normal conditions, comprising:
   a coupling choke being operably arranged between the electrical load and the external source of power;
   a generator with a single winding being operably connected to said coupling choke on the side of the electrical load and being designed and arranged to be active during normal conditions and during trouble conditions in case the external source of power fails;
   an IGBT converter being directly connected to said coupling choke;
   a substitute storage device for electrical energy being operably connected to said coupling choke on the side of the electrical load by said converter;
   a fast-opening switch being operably connected said coupling choke on the side of the source of power and being designed and arranged to open in case of occurring trouble conditions;
   a first unit being designed and arranged to sense an output voltage being supplied to the electrical load and to produce a measuring signal;
   a second unit being designed and arranged to control the output voltage, to use the measuring signal as an input signal, to deliver a control signal as an output signal to said converter and to control the output voltage to a desired shape over time; and
   said first and second units being designed to operate both during normal and trouble conditions to improve the quality of the power supply to the electrical load also during normal conditions.

2. The apparatus of claim 1, wherein the desired shape over time of the output voltage has the shape of a sinus function.

3. The apparatus of claim 2, further comprising a combustion engine being designed and arranged to drive said generator during trouble conditions.

4. The apparatus of claim 3, further comprising an overrunning clutch operably connecting said combustion engine to said generator.

5. The apparatus of claim 1, further comprising a combustion engine being designed and arranged to drive said generator during trouble conditions.

6. The apparatus of claim 5, further comprising an overrunning clutch operably connecting said combustion engine to said generator.

7. The apparatus of claim 1, wherein said substitute storage device includes at least one power source supplying direct current.

8. The apparatus of claim 7, wherein said power source supplying direct current includes a super conductive magnetic energy storage device (SMES).

9. The apparatus of claim 7, wherein said power source supplying direct current includes a super capacity.

10. The apparatus of claim 7, wherein said power source supplying direct current includes a battery.

11. The apparatus of claim 7, wherein said power source supplying direct current includes a fuel cell.

12. The apparatus of claim 1, wherein said substitute storage device includes at least one power source supplying alternating current.

13. The apparatus of claim 12, said power source supplying alternating current includes a generator and a rotating centrifugal mass.

14. The apparatus of claim 1, further comprising a transformer being operably arranged between said converter and the electrical load.

15. The apparatus of claim 1, wherein said coupling choke is also partly arranged between said generator and said converter, on the on hand, and the load, on the other hand.

16. An uninterruptible power supply system, comprising:
   a coupling choke being operably arranged between an external source of power and an electrical load to be supplied with power by the external source of power during normal conditions;
   a generator with a single winding being operably connected to said coupling choke on the side of the electrical load and being designed and arranged to be active during normal conditions and during trouble conditions in case the external source of power fails;
   an IGBT converter being directly connected to said coupling choke;

a substitute storage device for electrical energy being operably connected to said coupling choke on the side of the electrical load by said converter;

a fast-opening switch being operably connected said coupling choke on the side of the source of power and being designed and arranged to open in case of occurring trouble conditions;

a first unit being designed and arranged to sense an output voltage being supplied to the electrical load and to produce a measuring signal;

a second unit being designed and arranged to control the output voltage, to use the measuring signal as an input signal, to deliver a control signal as a output signal to said converter and to control the output voltage to a desired shape over time; and said first and second units being designed to operate both during normal and trouble conditions to improve the quality of the power supply to the electrical load also during normal conditions.

17. The system of claim 16, wherein the desired shape over time of the output voltage has the shape of a sinus function.

18. An uninterruptible power supply system, comprising:

a coupling choke being operably arranged between an external source of power and an electrical load to be supplied with power by the external source of power during normal conditions;

a generator with a single winding being operably connected to said coupling choke and being designed and arranged to be active during normal conditions and during trouble conditions in case the external source of power fails;

an IGBT converter being directly connected to said coupling choke;

a substitute storage device for electrical energy being operably connected to said coupling choke by said converter;

a switch being operably connected said coupling choke and being designed and arranged to open quickly in case of occurring trouble conditions;

a first unit being designed and arranged to sense an output voltage being supplied to the electrical load and to produce a measuring signal;

a second unit being designed and arranged to control the output voltage, to use the measuring signal as an input signal, to send a control signal as an output signal to said converter and to control the output voltage to attain a desired shape over time; and said first and second units being designed to operate both during normal and trouble conditions to improve the quality of the power supply to the electrical load also during normal conditions.

19. The system of claim 18, wherein the desired shape over time of the output voltage has the shape of a sinus function.

* * * * *